United States Patent [19]

Schwarzenbach

[11] 4,355,923
[45] Oct. 26, 1982

[54] CONSTANT PRESSURE STORAGE INSTALLATION WITH WATER SUPPLY FOR GAS TURBINE POWER PLANTS

[75] Inventor: Alfred Schwarzenbach, Wettingen, Switzerland

[73] Assignee: BBC Brown, Boveri and Company Limited, Baden, Switzerland

[21] Appl. No.: 193,098

[22] Filed: Oct. 2, 1980

[30] Foreign Application Priority Data

Dec. 5, 1979 [CH] Switzerland .................... 10785/79

[51] Int. Cl.³ ............................................ B65G 5/00
[52] U.S. Cl. ........................................ 405/59; 60/398; 405/53
[58] Field of Search ................ 405/53, 54, 55, 59, 405/210; 60/398

[56] References Cited

U.S. PATENT DOCUMENTS 744,694  11/1903  Sewall ............................ 405/53 X
4,045,963  9/1977  Hansson et al. ................. 405/53

Primary Examiner—David H. Corbin
Attorney, Agent, or Firm—Werner W. Kleeman

[57] ABSTRACT

A constant pressure air storage installation for gas turbine power plants containing a cavern and a water supply. In order to reduce the turbulence formation within the water and thus the diffusion of air into the water of the water supply there are provided means which serve to uniformly distribute over the cross-section of the cavern the water flow which arises during charging and discharging of the air space of the cavern and to render more uniform the velocity of such water flow.

4 Claims, 5 Drawing Figures

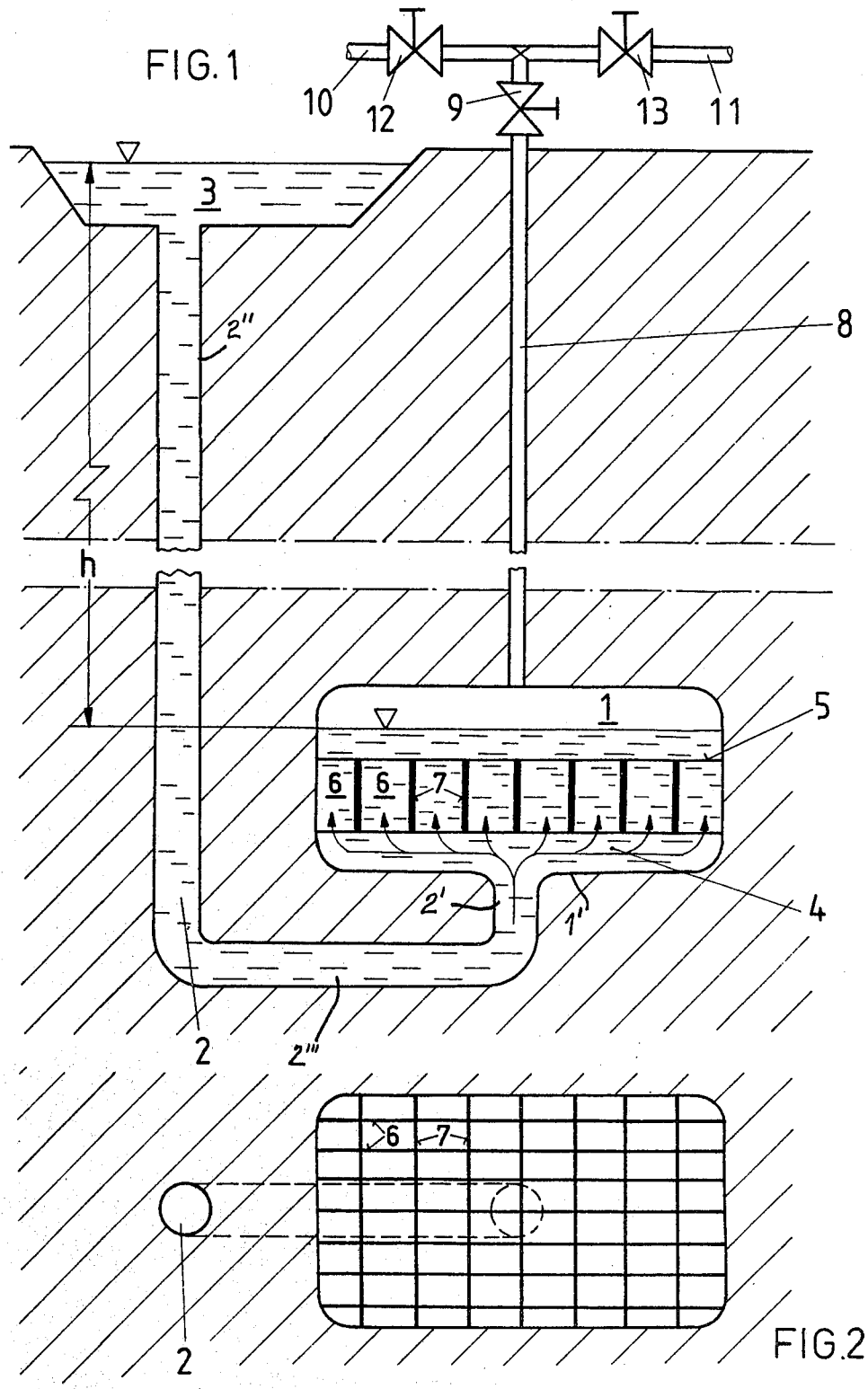

CONSTANT PRESSURE STORAGE INSTALLATION WITH WATER SUPPLY FOR GAS TURBINE POWER PLANTS

CROSS REFERENCE TO RELATED APPLICATION

This application is related to the commonly assigned, copending U.S. application Ser. No. 06/193,097, filed Oct. 2, 1980, entitled "Constant Pressure Air Storage Installation With Water Supply for Gas Turbine Power Plants" and U.S. application Ser. No. 06/192,375, filed Oct. 2, 1980, entitled "Apparatus for Preventing Blowing Out of the Water Supply of Constant Pressure Air Storage Installations".

BACKGROUND OF THE INVENTION

The present invention relates to a new and improved construction of a constant pressure air storage installation with water supply for gas turbine power plants.

Generally speaking, the constant pressure air storage installation for gas turbine power plants of the present development is of the type comprising a subterranean cavern for storage of compressed air and connection lines arranged between the cavern and a compressor and the gas turbine. Further, there is provided a compensation basin and a riser tube or conduit which connects the compensation basin with the cavern.

Constant pressure air storage installations for gas turbine power plants, in relation to air storage installations working with variable air pressure and having the same output or efficiency, and which air pressure can fluctuate within certain limits during operation, require only about one-third of the volume of the last-mentioned type of air storage installations. Hence, the structural expenditure and the erection costs of a cavern for a constant pressure storage installation is appreciably less than in the case of caverns working with variable air pressure.

To maintain the air pressure of a constant pressure storage installation constant there is used a water supply having a water column. The water supply conpensates or balances the volume of air which has been consumed in the cavern. The water column opens into a free basin which is located usually at ground level and whose static pressure gradient corresponds to the pressure which is to be maintained in the cavern. During charging of the cavern, which with present day installations is located at a depth in the order of about 600 to 800 meters, corresponding to a static pressure of the water column of 60 to 80 bar, the water is pressed upwardly into the basin, and during discharge of the cavern the water runs out of the basin into the cavern in order to ensure for the same pressure conditions.

During the operation of air storage gas turbine installations it has been found that during charging of the cavern the water column which rises within the water supply releases the air which is dissolved in the water column. Hence, air bubbles are formed which in upward direction rapidly increase in volume. These air bubbles cause a density reduction within the water column, and thus, a pressure drop within the cavern. In the extreme case the water column could be blown-out by the compressed air cushion and thus the cavern could completely empty.

In contrast to the normal velocity of dissolution of air in static water, the complete saturation occurs more rapidly in the cavern owing to the pronounced turbulence of the water during the charging and discharging operations, since after a very short amount of time all of the water particles come into contact with the air. The quantity by weight of air which is taken-up by the water is proportional to the pressure, which, as stated, with the prior art installations is in the order of between 60 and 80 bar. As to the thus dissolved air quantity the following comparison is informative:

At 1 bar air pressure and 10° C. temperature 1 $m^3$ water (=1000 kg) contains 29.2 g air.

At 60 bar pressure and 10° C. temperature 1 $m^3$ water contains 1.7 kg air, in other words approximately 58 times the amount by weight. At atmospheric pressure such 1.7 kg air corresponds to about 1.32 $m^3$. A water-air mixture which has expanded from 60 bar pressure to atmospheric pressure therefore contains more air than water.

If water which has been saturated with air in this manner ascends upwardly out of the cavern, then due to the decreasing hydrostatic pressure the air is released and forms increasingly larger size bubbles. The average density of the water column thus becomes increasingly smaller and there is a corresponding pressure drop in the cavern. If there are not undertaken appropriate measures this pressure drop can lead to blow-out of the compressed air cushion along with the water column.

A heretofore known measure for preventing this blow-out resided in extending the riser tube containing the water column along a U-shaped arc below the base of the cavern. The lowest point of the riser tube therefore must be located approximately 0.15 h below the momentary water level within the cavern, wherein h represents the effective pressure gradient, i.e. the difference between the geodetic height of the surface water level in the compensation or balancing basin and the cavern water level.

With h=600 m this would mean that the already 600 m long riser tube must be guided downwardly by still at least an additional 90 m, and specifically twice, resulting in an impermissably great increase in the costs of the construction.

SUMMARY OF THE INVENTION

Therefore, with the foregoing in mind it is a primary object of the present invention to overcome these decisive drawbacks of the prior art constructions.

Another and more specific object of the present invention aims at providing a new and improved construction of a constant pressure air storage installation with water supply for gas turbine power plants which is relatively simple in construction and design, economical to manufacture, and not afflicted with the previously discussed limitations and drawbacks of the prior art constructions.

Now in order to implement these and still further objects of the invention, which will become more readily apparent as the description proceeds, the constant pressure air storage installation of the present development is manifested by the features that within the cavern there are provided means for the uniform distribution of the water flow arising during charging and discharging of the cavern and for the rendering more uniform its flow velocity over the entire area of the cavern.

BRIEF DESCRIPTION OF THE DRAWINGS

The invention will be better understood and objects other than those set forth above, will become more apparent when consideration is given to the following detailed description thereof. Such descriptions makes reference to the annexed drawings wherein:

FIG. 1 schematically illustrates a first inventive embodiment of constant pressure air storage installation in vertical sectional view;

FIG. 2 is a top plan view in a horizontal sectional plane of the arrangement of FIG. 1 taken through the air space or chamber of the cavern;

DETAILED DESCRIPTION OF THE PREFERRED EMBODIMENTS

Figure 3:
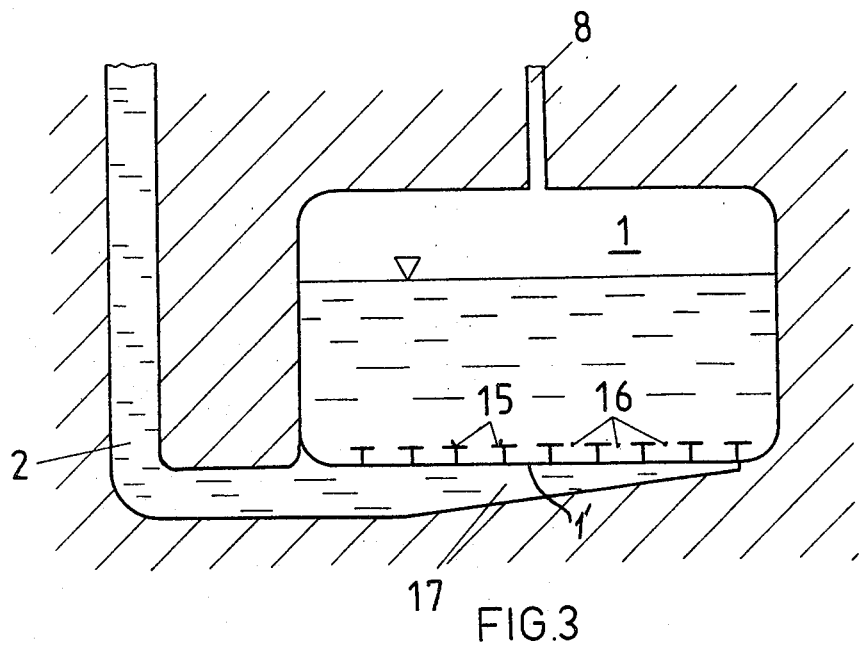
FIG. 3 is a vertical sectional view of a further embodiment of the invention.

Describing now the drawings, with the constant pressure air storage installation schematically shown in FIG. 1, there will be seen that at the base 1' of a cavern 1 there is located the mouth 2' of a riser tube or pipe 2, whose upper pressure-generating portion is vertically arranged so that there prevails the height h between the water level of the cavern 1 and a compensation or balancing basin 3. The riser tube or pipe 2 extends downwardly so as to form a substantially U-shaped channel 2''' which forms the aforementioned mouth 2'' at the base 1' of the cavern 1. To prevent blow-out of the water column and thus the air contained within the cavern 1 due to the previously discussed pressure gradient reduction of the water column, it would be necessary, if there were not provided the inventive measures and as also explained at the outset of this disclosure, to extend this substantially U-shaped channel 2''' through about 0.15 h below the lowest premissable water level of the cavern 1 which prevails during operation of the system. This, in turn, would be associated with an appreciable increase in the costs of the installation.

The invention exploits the concept of rendering as turbulent-free as possible the to-and-fro movement or back-and-forth oscillations of the water mass between the cavern 1 and the riser tube or pipe 2. The quieter the flow which prevails during charging and discharging of the cavern 1 that much less is the proportion of the water particles which come into contact with the cavern air, and thus, the saturation of the cavern water with air. In this way it is possible to avoid the danger of blow-out of the cavern water through the riser tube or pipe 2 during the charging operation. The devices which are to be provided for this purpose at the storage installation therefore have assigned thereto the task of rendering possible a laminar flow which is as free as possible of turbulence.

With the design illustrated in FIGS. 1 and 2 of such air storage installation the mouth or opening 2'' of the riser tube or pipe 2 is located at the cavern base 1' at the centre of its floor plan. In conjunction with the pronounced rounding of the mouth 2'' there is thus realised a uniform, symmetrical flow distribution in a flat space or chamber 4, free of any installations or components directly above the cavern base 1'. In order to also render laminar the flow in vertical direction, there can be provided above the space or chamber 4 up to the height normally reached by the water level, a rectification grid or meshwork 5 which, for instance, can be composed of vertical plates 6 and 7 arranged at right angles to one another. In this manner there is extensively rendered laminar also the vertical flow which arises during charging and discharging of the cavern 1 and there is reduced the formation of turbulence.

In FIG. 1 reference character 8 designates the air removal line for the overhead arranged not particularly illustrated but conventional gas turbine installation which is provided with a primary shutoff valve 9 as well as two switching valves 12 and 13 arranged in the air lines or conduits 10 and 11 and leading to the combustion chamber and the compressor of the gas turbine installation, respectively, in a manner as more fully shown and discussed in my aforementioned copending applications.

Figure 4:
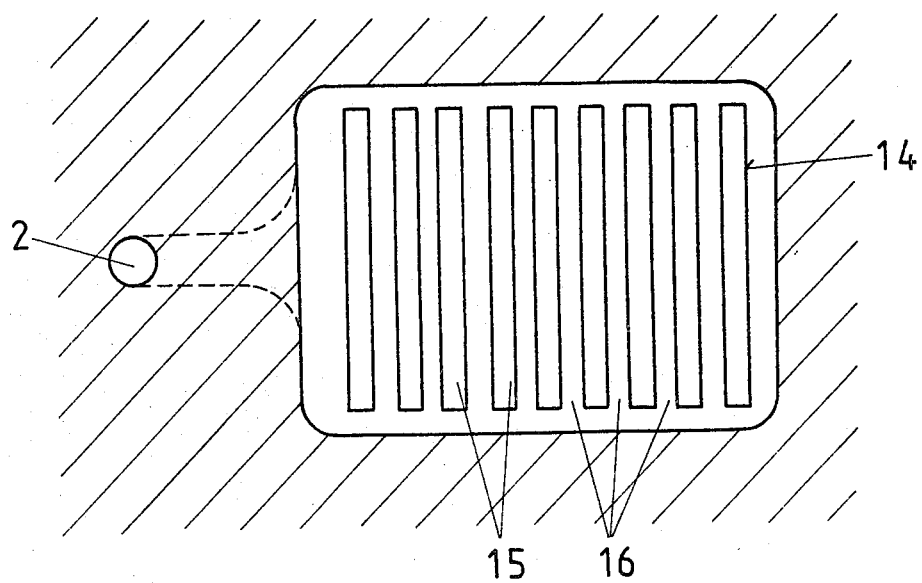
FIG. 4 is a plan view of the arrangement of FIG. 3.

With the embodiment illustrated in FIGS. 3 and 4, the rendering of the water flow laminar is accomplished by a grid or grating arrangement 14 composed of substantially T-shaped profile rods 15 and provided directly over the base 1' of the cavern 1, wherein the grid spaces 16 ensure for a uniform distribution of the influxing and effluxing flow. The horizontal lowermost portion of the riser tube or pipe 2, while widening to the width of the cavern 1, merges into an infeed channel 17 which, in this case, is located directly below the base 1' of the cavern 1 and whose depth reduces in the lengthwise direction of such cavern 1 in accordance with the continuity conditions of the flow, in order to obtain as constant as possible flow velocity. With this embodiment having the infeed channel 17 provided directly below the base 1' of the cavern 1, from the constructional stand-point, such is more favourable than the infeed arrangement used in the embodiment of FIGS. 1 and 2 which is constituted by the U-shaped flexed lower end 2''' of the riser pipe or tube 2.

Figure 5:
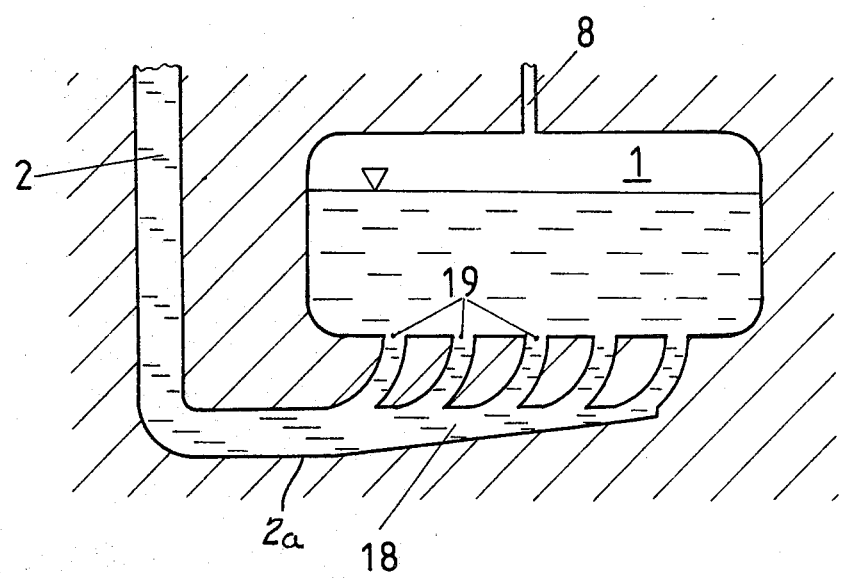
FIG. 5 is a vertical sectional view through a third embodiment of the invention.

With the embodiment shown in FIG. 5 in vertical sectional view, the lower horizontal portion 2a of the riser tube 2 likewise widens below the base surface of the cavern 1 into an infeed or inflow channel 18 having a width corresponding to that of the cavern 1, and the depth of which inflow channel reduces in the lengthwise direction of such channel in accordance with the continuity flow equation or conditions. Branching-off of the inflow channel 18, and uniformly distributed over the base 1' of the cavern 1 and opening into such cavern 1 are the inflow tubes or pipes 19, so that, in this case, the flow distributes rather uniformly over the entire volume of the cavern 1 and there are extensively avoided the formation of turbulence or vorticities.

All of the described embodiments and further embodiments which are conceivable within the teachings and underlying principles of the invention, ensure that the flow arising during charging and discharging of the cavern is uniformly distributed over the volume of the cavern, so that in particular the velocity gradients transverse to the flow direction can be maintained small, thereby reducing the formation of turbulence and thus intensified diffusion of the air into the water.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. A constant pressure air storage installation with water supply for gas turbine power plants, comprising:
   a subterranean cavern for the storage of compressed air;
   a compensation basin containing a water supply for compensating for the volume of air consumed from the cavern;
   a riser tube for confining a water column therein and connecting the compensation basin with the cavern;
   means provided for said cavern for the uniform distribution of the flow of water arising during charging and discharging of the cavern and for the compensation of the flow velocity of the water over the entire surface area of the cavern; and
   said means for the distribution and rendering essentially uniform the flow of the water being structured to render as turbulent-free as possible to-and-fro movement of the water mass between the cavern and the riser tube, to thereby minimize the danger of blow-out of the cavern water through the riser tube.

2. The constant pressure air storage installation as defined in claim 1, wherein:
   said means for the distribution and rendering essentially uniform the flow of the water comprises rectification grid means;
   said rectification grid means filling-out essentially the entire horizontal cross-section of the cavern; and
   said rectification grid means being composed of two rows of parallel plates which intersect one another essentially at right angles and between whose lower edge and the base of the cavern there is provided a space free of any components.

3. The constant pressure air storage installation as defined in claim 1, wherein:
   said means for distributing and rendering essentially uniform the flow of the water comprises a series of essentially parallel T-profile rods;
   said profile rods being spaced from one another by respective gaps;
   said profile rods being arranged at a base level of the cavern in a plane and covering the entire base surface of the cavern;
   an inflow channel provided below the plane of the profile rods;
   said inflow channel extending essentially over the base surface of the cavern;
   said riser tube having a mouth portion; and
   the depth of said inflow channel continuously decreasing, starting from the mouth of the riser tube, towards all sides.

4. The constant pressure air storage installation as defined in claim 1, further including:
   an inflow channel provided below the base of the cavern;
   said inflow channel extending essentially over the base surface of the cavern;
   said riser tube having a mouth;
   said inflow channel having a depth which starting from the mouth of the riser tube decreases continuously towards all sides;
   a multiplicity of inflow tubes distributed essentially uniformly over the base surface of the cavern provided for said cavern; and
   said inflow tubes extending essentially tangentally out of said inflow channel and opening essentially at right angles into the cavern with respect to the base of the cavern.

* * * * *